United States Patent Office 3,759,867
Patented Sept. 18, 1973

3,759,867
MOLDING COMPOSITIONS CONTAINING
SILANOL-FREE RESINS
Duane F. Merrill, Ballston Spa, and Richard C. Cooke, Jr., Elnora, N.Y., assignors to General Electric Company
No Drawing. Filed Mar. 2, 1972, Ser. No. 231,402
Int. Cl. C08g 51/04
U.S. Cl. 260—37 GB            29 Claims

ABSTRACT OF THE DISCLOSURE

A silicone molding composition having improved thermal shock resistance having as its main ingredients a silicone resin of a high silanol content, that is, a silanol content of 3 to 11% by weight of the resin, and a low silanol content resin having less than .5 weight percent of silanol groups and preferably being substantially silanol-free. The molding composition is prepared by mixing the low content silanol resin with a filler and then adding to the mixture a pigment, catalyst system, a process aid and a release agent. To this resulting mixture there is then added the high silanol content binder resin and additional filler, such as glass fibers. The resulting mixture is extruded to a sheet which is then ground into fine particles, the fine particles being an uncured molding resin composition.

BACKGROUND OF THE INVENTION

The present invention relates to silicone molding compositions and, in particular, the present invention relates to molding compositions having therein as a basic ingredient a low silanol content silicone resin and, preferably, a silicone resin which is substantially free of silanol groups.

Silicone molding compositions are well known, as evidenced by the disclosure of Alvin Joseph Alekna, Ser. No. 108,652 filed Jan. 21, 1971, entitled "Catalyzed Siloxane Resin Systems," now patent Ser. No. 3,666,830, patented May 30, 1972. Such silicone molding compositions usually comprise a silicone resin, a catalyst system and, preferably, a filler. These ingredients are ground into particles which, when used in molding and particularly transfer molding, are heated to form a liquid which is passed through a small transfer molding channel into the mold cavity and thereupon cured to form the molded object.

Such transfer molding is usually used to encapsulate and protect electronic parts. Silicone molding compositions are preferred for encapsulating electronic parts because of their fire retardant properties, because of their dielectric constant, and further for their resistance to moisture and atmospheric conditions. Accordingly, it has become desirable in the electronics industry to encapsulate electronic components with silicone molding composition. However, it has been found that most such silicone compositions have an important deficiency in their final cured state. Thus, it is well known that electronic components are subject to great fluctuations of temperature. Thus, for instance, solid state diodes, triodes, resistors in an electronic system may, within a period of seconds, change temperature from room temperature to a temperature as high as 200° C. or higher. Again, in the reverse state, when the electronic system is closed down, such electronic components also cool very quickly so that they change temperature, that is, they cool down from a temperature of 200° C. to room temperature in a very short period of time. Thus, it is necessary for any encapsulating material to have flexibility and particularly to have thermal shock resistance, that is, the electronic component encapsulating material must be capable of undergoing such rapid extreme temperature changes, that is, from 0 to 200° C. and above, in a period of 30 seconds without cracking or crazing.

Thus, it was found that the known silicone molding compositions and other types of thermosetting composisions were deficient in this area of thermal shock resistance and particularly within the temperature ranges indicated above.

In addition, it was felt desirable to somehow improve the moisture resistance of such thermosetting silicone resin composition. To accomplish these objects, various courses of action were taken with little success. For instance, known silicone plasticizing fluids were added to the silicone resin thermosetting compositions. In addition, there was the resin to filler ratio which was varied with little success. In addition, the composition of the resin, that is, the binder silicone resin, was varied in terms of the ratio of the organic radical to the silicon atom with little success.

In addition, well known organic plasticizers were incorporated into the silicone resin thermosetting composition with little change in the thermal shock resistance of the resulting composition. One of the problems that was discovered in using a plasticizer for such silicone resin thermosetting compositions was to find a material that was compatible with the silicone resin that was used as the basic ingredient in the composition. Unfortunately, it was found that most silicon fluids that were tried were not compatible with the silicone binder resin and, as a result, these plasticizer fluids would separate out from the composition and not incorporate into the resulting composition their plasticizing properties. Thus, it was quite unexpected to discover that a silicone resin having a silanol content of less than .5 weight percent, and preferably being free of silanol groups, could be compatible with normal binder silicone resins used in silicone resin thermosetting compositions and would act as a plasticizer for such a binder resin.

Thus, it is one object of the present invention to provide for a novel silicone resin thermosetting composition having therein as the main ingredients a high silanol content silicone resin and a low silanol content silicone resin.

It is another object of the present invention to provide a novel silicone resin thermosetting comopsition with improved thermal shock resistance.

It is yet another object of the present invention to provide for a novel silicone resin thermosetting composition with improved moisture resistance.

It is yet still another object of the present invention to provide a novel process for producing an uncured silicone resin molding composition, which composition, when cured, has improved thermal shock resistance and moisture resistance.

These and other objects of the present invention are accomplished by means of the novel silicone resin thermosetting composition set forth below.

SUMMARY OF THE INVENTION

In accordance with the above objects, there is provided by the present invention a silicon resin thermosetting composition having improved thermal shock resistance and moisture resistance comprising (a) a silicone resin of a high silanol content of the formula:

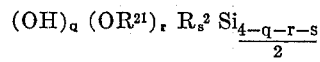

where $R^2$ is selected from the class consisting of lower alkyl radicals having from 1 to 8 carbon atoms, cycloalkyl radicals having 5 to 7 carbon atoms, lower alkenyl radicals having 2 to 8 carbon atoms; mononuclear aryl radicals; mononuclear aryl lower alkyl radicals having 1 to 6 carbon atoms in the alkyl group; and halogenated derivatives of the above radicals; (OR$^{21}$) is a lower alkoxy radical containing from 1 to 8 carbon atoms per radical; $q$ has a value of 0 to 1.0, $r$ has a value of 0 to 1.0; $s$ has a value of 1.0 to 1.7 and the sum of $q$ plus $r$ has a value of 0.01 to 1.0, wherein the above resin has a silanol and alkoxy group content of at least 4% by weight and the content of the silanol groups by themselves is at least 3% by weight, (b) a low silanol content silicone resin which is 5 to 50% by weight of the total of (a) and (b) comprising RSiO$_{3/2}$ units and R$_2$SiO$_2$ units, where the R to Si ratio may vary from 1:1 to 1.9:1 and the ratio of the RSiO$_{3/2}$ units to the R$_2$SiO$_2$ units may vary from 1:2.5 to 1:5.0 and containing less than 0.5 weight percent silanol groups, where R is selected from the group consisting of alkyl radicals of 1 to 8 carbon atoms, cycloalkyl radicals of 5 to 7 carbon atoms, mononuclear aryl radicals, mononuclear aryl lower alkyl radicals where the alkyl group has 1 to 6 carbon atoms, alkenyl groups of 2 to 8 carbon atoms, and halogenated derivatives of the foregoing radicals; (c) a catalyst system and (d) a filler. There is preferably used two types of filler in the present composition. When the above composition is to be used as a molding composition, and particularly a molding composition for transfer molding, it is preferred that there be first incorporated a silica filler into the composition and then towards the end of the mixing procedure that glass fibers be added as an additional filler. The cataxyst system is preferably a lead compound and, more preferably, the catalyst system comprises a mixture of a lead compound and a carboxylic acid anhydride or, less preferably, a carboxylic acid. There may also be incorporated into the silicone thermosetting composition such normal ingredients for molding compositions such as pigments and release agents. To facilitate the mixing of the filler into the silicone resin, and particularly the silica type fillers, there is used any one of the well known process aids which are normally added to the fillers when they are incorporated into organopolysiloxane gums. When the composition is to be used as a molding composition, the uncured silicone resin molding composition is prepared by mixing a low silanol content resin with the silica filler. Preferably, part of the silica filler is a silazane treated fumed silica filler which desirably thickens the silicone resin melt when the silicone molding composition is melted before transfer into the mold cavity. There is then incorporated into the mixture of the filler and low silanol content resin, process aid, release agent, pigment and the catalyst system. After the resulting ingredients have been thoroughly mixed, there is then added binder resin and additional filler. They are then taken and caused to melt so as to form a sheet which is cooled and ground up into particles of preferably less than 10 mesh size. These resulting uncured resin molding composition particles may then be stored and used whenever desired to form silicone molded objects.

It should be pointed out that the present composition in its broadest interpretation, particularly the present invention in its broadest interpretation, is not to be limited solely to silicone resin molding compositions but the basic ingredients of the low silanol content resin, high silanol content resin, filler and catalyst system may be used to form other types of thermosetting silicone resin composition. Thus, for instance, if carbon is used as a filler, the composition can be used to form a resistor. In addition, fillers such as asbestos and nylon can be used to produce a product which is useful for mechanical applications. In addition, fillers such as silicates, carbonates and organic oxides and hydroxides can be used to form a thermosetting composition whch may have various uses to produce various silicone products, such as silicone housewares.

DESCRIPTION OF THE PREFERRED EMBODIMENT

The R radicals of the low silanol content resin are selected from the class consisting of lower alkyl radicals, methyl, ethyl, propyl, butyl and octyl radicals, and are preferably lower alkyl radicals of 1 to 8 carbon atoms; cycloalkyl radicals having 5 to 7 carbon atoms in the ring, e.g., cyclopentyl, cyclohexyl, cycloheptyl radicals; lower alkenyl radicals, e.g., vinyl and allyl radicals and preferably lower alkenyl radicals of less than 2 to 8 carbon atoms; mononuclear aryl radicals, e.g., phenyl, tolyl, xylyl; mononuclear aryl lower alkyl radicals where the alkyl group may have 1 to 6 carbon atoms, e.g., benzyl and phenylethyl radicals; and halogenated derivatives of the above radicals, e.g., chloromethyl, beta-chloroethyl, chlorophenyl, dibromophenyl and trifluoromethylethyl radicals. Preferably, the R radicals are both alkyl and aryl radicals where in the same resin there are both types of radicals present. More preferably, in the same resin there are methyl and phenyl radicals present. It is preferred that at least 40 mole percent of the R radicals in the RSiO$_{3/2}$ units be aryl radicals and, more preferably, phenyl and it is preferred that 40 mole percent of the R radicals in the R$_2$SiO$_2$ units be aryl radicals, more preferably phenyl. The presence of phenyl radicals in the resin not only imparts fire retardancy to the resin but, in addition, additional insulating properties. Even further, the presence of a substantial amount of phenyl radicals in both types of units, that is the trifunctional RSiO$_{3/2}$ unit and difunctional unit R$_2$SiO$_2$ unit, imparts to the resulting resin more flexure strength, that is, the resin has better thermal shock resistance and is less brittle and is thus less susceptible to crazing and cracking due to rapid temperature changes or as the result of being hit by a hard object. The R to Si ratio in the low silanol content resin of the present case may be anywhere from 1:1 to 1.9:1. However, more preferably the R to Si ratio in the low silanol content silicone resin of the present case, when such resin is to be used for molding compositions, is from 1.7:1 to 1.9:1. In addition, the ratio of the trifunctional units to the difunctional units may be anywhere from 1:2.5 to 1:5.0. More preferably, in the low silanol content resins to be used for molding compositions, the ratio is 1:3.5 to 1:5.0.

One of the critical aspects of the low silanol content resin case is that it have a silanol content of less than .5 weight percent. More preferably, the low silanol content resin of the present case has a silanol content of less than .25 weight percent and, even more preferably, it is substantially silanol-free as measured by the well known method for testing for silanol groups, Zerewitinoff. Preferably, this low silanol content resin is present in a concentration of 5 to 50 percent by weight of the total weight of high silanol content resin and low silanol content resin in the silicone thermosetting composition. More preferably, the concentration of the low silanol content resin based on the total weight of silicone resin present in the composition, and particularly the molding composition, is from 15 to 35 percent by weight. The low silanol content resin of the present case is produced by hydrolyzing organohalogensilanes of the formula:

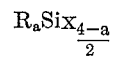

where R is as defined previously, X stands for halogen and preferably chlorine, and $a$ varies from 1 to 2. Such a mixture of organohalogensilanes are slowly added to water, where there is at least two parts of water per part of silane blend. The temperature of addition in the reaction to form the hydrolyzate is controlled to between 25° C. to 85° C. and the chlorosilanes added at a sufficiently slow enough rate so that the temperature of the hydrolyzate water silane mixture stays within this temperature range. If the temperature of the water goes above 85° C., some of the silanes might boil off. If the temperature of the reaction mixture goes below 25° C., then there is formed diphenyldiol, the presence of which in the final resin results in deterioration in the physical properties of the final cured thermoset compound or molded compound. In addition, if the temperature is too high, the resulting hydrolyzate may gel. Accordingly, to avoid this, the temperature is kept within the range indicated above.

The proper mixture of trifunctional halogensilanes and difunctional halogensilanes are added to the water so as to obtain the desired R to Si ratio and also to obtain the desired trifunctional unit to difunctional unit ratio in the final silicone resin. After all the halogensilanes are added to the water to form a silicone resin emulsion-hydrolyzate, then there is added a water-miscible organic solvent to the mixture to extract the resin into the solvent. Examples of suitable organic solvents are, for instance, toluene and xylene, which are the most preferred for this purpose. Usually, there is added one part of solvent for each part of water in the hydrolyzate. The solvent and the hydrolyzate are mixed thoroughly together and the layers are all separated off. The organic layer which is then separated and placed in a separate container, contains the resin. Such an organic layer may be washed several times with water so as to remove from the resin any impurities, such as hydrochloric acid. The solution is then adjusted to a solids content of 10 to 40 percent and 3 to 600 parts per million of an alkaline metal hydroxide is added, based on the weight of the solids. The resulting base catalyzed mixture is then heated to reflux, that is, a temperature of above 130° C. for anywhere from 1 to 6 hours so as to remove all the silanol groups in the resin. Thus, the condensation is continued until it is visually seen that no more water is being given off or until the resin is tested to indicate that it has a silanol content of less than 0.5 weight percent and, preferably, is free of silanol groups. The resulting mixture is then cooled and there is added to it an acid to neutralize the base catalyst in the solution. Preferably, the acid that is added is acetic acid, since any excess can be stripped off. After the base has been neutralized, the resulting mixture is heated above reflux to strip off the excess solvent. Further, in addition, if acetic acid is used, the resulting mixture can be heated to reflux of the solvent to strip off the excess acetic acid and also to strip off the excess solvent until the solids concentration is 70 to 80 percent or as much as 100 percent solids. In either case, for molding compositions it is preferable to use a solution of 70 to 80 percent solids which is more easily incorporated with the other ingredients that are to be found in such a composition. The resulting low silanol content resin may then be stored until it is ready for use as a plasticizer or additive to silicone molding compositions of other types of thermosetting silicone resin compositions. For a more thorough description of the process by which this resin is made, the reader is referred to the patent application of Merrill and Cooke entitled "Silanol-Free Resins," Ser. No. 231,403, filed Mar. 2, 1972.

The high silanol content siloxane resins that can be used in the composition of this invention are well known materials. By the term "siloxane resin" it is meant polymers containing two or more siloxane units and having the average unit formula:

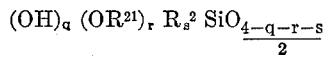

where $R^2$ is selected from the class consisting of lower alkyl radicals, e.g., methyl, ethyl, propyl, butyl and octyl radicals; cycloalkyl radicals having 5 to 7 carbon atoms in the ring, e.g., cyclopentyl, cyclohexyl and cycloheptyl radicals; lower alkenyl radicals, e.g., vinyl and allyl radicals; mononuclear aryl, e.g., phenyl, tolyl and xylyl; mononuclear aryl lower alkyl radicals, e.g., benzyl and phenylethyl radicals; and halogenated derivatives of the above radicals, e.g., chloromethyl, beta-chloroethyl, chlorophenyl, dibromophenyl and trifluoromethylethyl radicals. Preferably, R and $R^2$ are selected from the class consisting of methyl, ethyl and phenyl.

The lower alkoxy radicals, $OR^{21}$, are selected from the class consisting of lower alkoxy radicals having 1 to 8 carbon atoms, e.g., methoxy, ethoxy, propoxy and isopropoxy radicals and is preferably selected from the class consisting of the above specifically named radicals; $s$ has a value of 1.0 to 1.8 and preferably has a value of 1.05 to 1.45; $q$ has a value of 0 to 1.0 and preferably a value of 0.2 to 0.55; $r$ has a value of 0 to 1.0 and preferably has a value of 0.2 to 0.55 and the sum of $q$ plus $r$ has a value of 0.01 to 1.0 and preferably has a value of 0.2 to 0.55.

Examples of siloxane units that can be present in the high silanol content siloxane resin are:

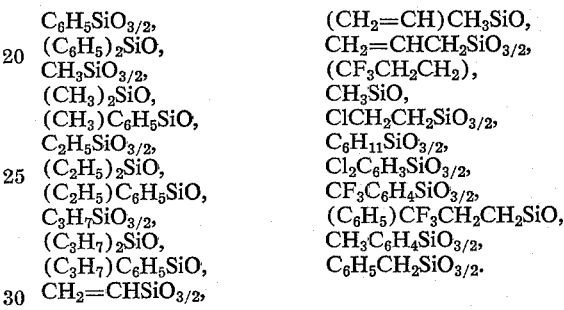

The ratio of the organic substituents to the silicone atoms in the above-described siloxane resin must be in the range of 1.0:1 to 1.8:1. Preferably, the resin has a phenyl to silicon ratio of 0.5:1 to 0.7:1, and other substituents to silicon ratio of 0.5:1 to 0.1:1, and a total phenyl and other substituents to silicon ratio of 1.05:1 to 1.45:1. The preferred resins of this invention are the phenylmethysiloxane resins, i.e., resins containing siloxane units containing phenyl groups, and siloxane units containing methyl groups. The preferred resin contains some siloxane units having two monovalent hydrocarbon substituents per siloxane unit as this adds flexibility to the cured resin. Preferably, from 5 to 45% of the siloxane units contain two monovalent hydrocarbon substituents per siloxane unit.

In addition, the resin must contain at least 4.0% by weight of silicon-bonded OH and/or ($OR^{21}$) groups. The resin can contain a much higher percentage of OH groups and preferably contains at least 5 weight percent of OH groups, although it need have only 4% by weight of hydroxyl groups. At least 4 weight percent of OH groups and ($OR^{21}$) groups is a necessary requirement to produce a properly cured molding compound. It is preferable that 90% of the total OH and ($OR^{21}$) goups be OH groups. The ($OR^{21}$) groups are lower alkoxy groups having up to 8 carbon atoms, such as methoxy, ethoxy and isopropoxy groups. The presence of such groups on methylsiloxy groups in the resin aids in regulating the cure time of the resin. As the ratio of alkoxy groups to siloxy groups increases, the cure time increases.

If desired, fillers and pigments can be added to the uncured resin to increase the strength of the cured resin, reduce crazing, make a more attractive product, etc. The particular pigment or filler employed in the composition of this invention is not critical but fillers which have a catalytic effect in themselves toward the resin of this invention should be avoided. Alkaline fillers in large quantities and strongly acidic fillers should be particularly avoided as should other fillers which exert a catalytic effect on the condensation of the silicone resin. Some inert fillers which are suitable are ground glass, diatomaceous earth, crushed quartz, fume silica, precipitated silica, magnesium silicate, zirconium silicate and aluminum silicate. The preferred fillers are zirconium silicate, chopped glass fibers, aluminum oxide, fumed silica and ground fused silica. The amount of filler present in the resin can vary from 0% up to the point where the filler concentration is so high that it interferes with the flow properties of the molding resin. This point is, of course, a function of the type and amount of process aid present and the porosity of the filler.

Other binder silicone resins which may be used in the practice of the present invention, generally speaking, are well known in the art. For example, see U.S. Pats. 2,646,441 of Duane, 3,135,713 of Brewer et al. and 3,389,114 of Burzynski et al. and the discussion therein.

The preferred resins for use in the practice of the present invention are those having a silanol (measured as OH) content of 5% to 7% by weight or a silanol content as high as 11%. The method of making such resins is generally set forth in U.S. patent application Ser. No. 671,574 of Duane F. Merrill, filed Sept. 29, 1967, and now abandoned, entitled "Silanol-Containing Organopolysiloxane Resins and a Method for Making Them." In addition, the preferred resins also contain some siloxy groups which are substituted with one methyl radical per siloxy unit and these mono-substituted siloxy units also contain some alkoxy substitution. It is the siloxy units in the resin which are mono-substituted with methyl groups and which also contain some alkoxy substitution which regulates the cure time of the resin.

Silanol-containing organopolysiloxane resins having a silanol content of 4% to 11% or 12% can be made by hydrolyzing organohalosilanes utilizing a water immiscible organic solvent and acetone as a cosolvent. The method involves agitating a mixture comprising (A) organohalosilane preferably in combination with a lower alkyltrialkoxysilane, (B) water, (C) acetone, (D) a water immiscible organic solvent, and (E) an aliphatic monohydric alcohol having from 1 to 8 carbon atoms, where there is present by weight in said mixture, per part by weight of (A), 1.7 to 10 parts of (B),
0.2 to 5 parts of (C), and
0.3 to 5 parts of (D), and from 0 to 1 mole of (E) per mole of halogen attached to silicon of (A), (2) separating an organic solvent solution of (F) from the resulting hydrolysis mixture of (1), where (F) is a silanol-containing organopolysiloxane having an average ratio of from about 1 to 1.7 organo radicals per silicon atoms, and (A) is selected from (a) organotrihalosilane,
(b) a mixture of organotrihalosilane and diorganodihalosilane,
(c) the reaction product of (E) and a member selected from (a) and (b), which has an average ratio of up to 1 alkoxy radical per halogen radical,
(d) a mixture of (c) and a member selected from (a) or (b), and wherein the organo radicals of (A) and (F) are attached to silicon by carbon-silicon linkages and are selected from monovalent hydrocarbon radicals, halogenated monovalent hydrocarbon radicals and cyanoalkyl radicals.

Included by the organohalosilanes which can be employed in the practice of the present invention are silanes of the formula, $$(R^2)_a SiX_{4-a}$$

where $R^2$ is as defined previously, X is a halogen radical such as chloro, and $a$ is an integer having a value of 1 or 2. In addition, there can be employed in combination with such organohalosilanes an aliphatic monohydric alcohol of the formula, $$R^{21}OH$$

or an alkoxylated organosilane of the formula, $$(R^2)_a(R^{21}O)_b SiX_{4-a-b}$$

where $R^2$ and $R^{21}$ are as defined previously; X and $a$ are as defined above, $b$ is an integer equal to 1 to 3, inclusive, and the sum of $a$ and $b$ is equal to 2 to 4, inclusive.

Included by the organohalosilanes are, for example, methyltrichlorosilane, dimethyldichlorosilane, methylphenyldichlorosilane, phenyltrichlorosilane, diphenyldichlorosilane, etc. Included by the partially alkoxylated organohalosilanes are reaction products of organohalosilanes where $R^2$ is preferably selected from the class consisting of monovalent hydrocarbon radicals and halogenated monovalent hydrocarbon radicals, with alcohols of the above formula, such as methyl alcohol, ethyl alcohol, propyl alcohol, isopropyl alcohol, butyl alcohol, etc.

In instances where the aliphatic monohydric alcohol is utilized in the practice of the invention, the alcohol can be added directly to the organohalosilane before hydrolysis or it can be added to the hydrolysis mixture prior to the addition of the organosilane. As a result, the silanol-containing organopolysiloxane of the present invention can be free of, or contain, chemically combined alkoxy radicals attached to silicon.

The preferred uncured silicone resins of the present invention can have from 4% to 11% and even as much as 12% and, preferably, from 5% to 7% by weight of hydroxy radicals attached to silicon. These resins are friable fast curing molding materials when at 100% solids. Experience has shown that in most instances the average ratio of the $R^2$ radicals to silicon will determine the nature of the resin and its utility. For example, resins at 100% solids having an average ratio of about 1 to about 1.2 $R^2$ radicals per silicon atom, a silanol content of from 4% to 11% by weight, with or without chemically combined alkoxy radicals, are generally friable and suitable for molding applications. These moldable materials have been found to soften at temperatures as low as 60° C. and generally flow at temperatures between 70° C. to 90° C.

In accordance with the method of the invention, hydrolysis is achieved by agitating the organohalosilane in the presence of water, acetone and organic solvent. The organic layer is separated from the acid layer which forms during hydrolysis. The organic phase then is stripped to produce a 100% solids resin.

Although the order of addition of the various ingredients is not critical, it is preferred to add the organohalosilane to the mixture of water, acetone and organic solvent. Preferably, a proportion of from 2 to 6 parts of water, 0.3 to 2 parts of acetone and 0.6 to 2 parts of organic solvent per part of organohalosilane can be employed. Suitable organic solvents are, for example, any water immiscible organic solvent which is inert to the hydrolysis reactants during hydrolysis and in which the hydrolyzate is soluble, to provide for its separation from the aqueous layer. For example, there can be employed as a hydrocarbon such as benzene, toluene, xylene, etc.; esters such as butyl acetate and ethyl acetate; ethers such as diethyl ether, dioxane, etc. During the addition, the mixture is agitated to provide for a sufficient degree of hydrolysis of the organohalosilane and formation of the organopolysiloxane hydrolyzate. The temperature of the hydrolysis mixture can be controlled by the rate of addition of the chlorosilanes or external heat or cooling can be employed if desired. During hydrolysis, a temperature between 0° C. to 80° C. has been found effective, while a temperature between 20° C. to 40° C. is preferred. After the addition has been completed, the mixture can be stirred for an additional period of time, such as 30 minutes or more, to allow for complete hydrolysis of the organohalosilanes. The mixture is then allowed to settle and the acid layer can be drawn off from the organic layer. The organic layer can then be stripped of solvent to 100% solids.

When making molding resins, it has been found expedient to strip under reduced pressure, such as a pressure between 25 mm. to 500 mm. Hg to a solids concentration of from 50% to 70% by weight of the resin solution. Resin impurities can be removed at this solids concentration such as by filtration, centrifuging, etc. Further stripping can be employed to 100% solids at a temperature sufficient to remove all of the residual solvent. For example, when stripping toluene, a temperature up to 130° C. has been found effective.

In instances where the average $R^2$ to Si ratio is above 1.2, for example 1.2 to 1.4 or 1.4 to 1.8, it is preferred to strip at atmospheric pressure to a solids concentration of up to about 95%. If it is desired, the resin can be refluxed 2 to 3 hours at temperatures between 190° C. to 230° C. to further improve the characteristics of the resin.

There is preferably used 0.5 to 12% by weight of the total of high silanol content resin and low silanol content resin of a process aid. Any silane or polysiloxane fluid containing alkoxy or silanol groups is suitable as a process aid.

Generally speaking, silanes which can be employed as the process aid in the practice of the present invention are those falling within the scope of the formula $R^3{}_t(OH)_u(OR^4)_vSi$, where $R^3$ is selected from the class comprising lower alkyl radicals having 1 to 8 carbon atoms; cycloalkyl radicals having 5 to 7 carbon atoms in the ring; lower alkenyl radicals having 2 to 8 carbon atoms; mononuclear aryl radicals; mononuclear aryl lower alkyl radicals having 1 to 6 carbon atoms in the alkyl group; and halogenated derivatives of the above radicals; $OR^4$ is a lower alkoxy radical containing from 1 to 8 carbon atoms per radical; $t$ has a value of 1 to 3; $u$ has a value of 0 to 3; $v$ has a value of 0 to 3; and the sum of $u$ plus $v$ has a value of 1 to 3.

Generally speaking, siloxane compounds which can be employed as a process aid in the practice of the present invention are those falling within the scope of the formula $$R^5{}_x(HO)_y(OR^6)_z SiO_{\frac{4-x-y-z}{2}}$$

where $R^5$ and $(OR^6)$ are defined as $R^3$ and $(OR^4)$, respectively, are defined above; $x$ has a value of 1 to 3; $y$ has a value of 0 to 2, $z$ has a value of 0 to 2; and the sum of $y$ plus $z$ has a value of 0.02 to 2. When $x$ has a value of less than 1.7, there must be at least 5% by weight of HO and $(OR)^2$ groups in the siloxane compound. It is preferable that $z$ have a value of 0. Examples of polysiloxanes which can be used are:

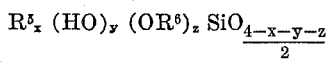

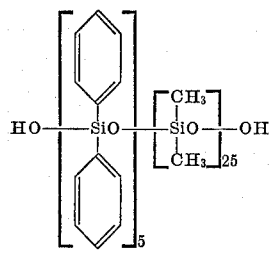

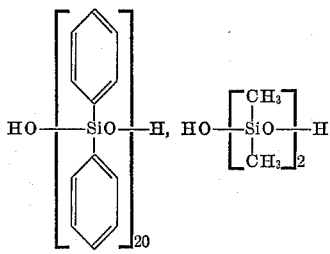

The choice of which silicon-containing materials to use in a process depends in part on the length of storage, i.e., a more volatile material will be lost to a greater degree on storage than a less volatile material, on the degree of plasticity desired in the final cast resin, and the silanol content of the casting resin, i.e., if the silanol content of the resin is relatively high, the silanol or alkoxy content of the polysiloxane process aid can be relatively low and, in fact, if the silanol content of the binder resin is over 6% by weight, it is not necessary that the process aid have any silanol groups. It is preferred to use a silanol-containing polysiloxane fluid process aid in combination with binder resins having a silanol content of over 4%, since the process aid facilitates the mixing of the ingredients to form the molding composition. Other process aids that may be used in the present invention are disclosed in Martellock U.S. Pat. 3,469,945 and Konkle et al. U.S. Pat. 2,890,188. Generally, any process aid that facilitates the mixing of filler in a heat vulcanizable silicone rubber composition may be used in the present invention.

In order for the above-defined molding composition mixture or silicone resin thermosetting composition composed of a low silanol content silicone resin and a high silanol content silicone resin filler and a process aid to cure properly, there is necessitated the presence of a catalyst. Preferably, there is present from 0.01 to 6% by weight of the total weight of the high silanol content resin and the low silanol content resin of a catalyst system. In the less preferable form, such a catalyst system comprises solely a lead compound. The preferable lead compounds that may be used in such a catalyst system are selected from the class consisting of $2PbCO_3 \cdot Pb(OH)_2$, $PbCO_3$, $Pb_2O_3$, $Pb_3O_4$ and $PbO_2$ and other types of the well known lead salts. More preferably, in such a catalyst system, for the catalyst system to have the proper activity, there is used a combination of one of the lead compounds mentioned above and a carboxylic acid anhydride. Suitable anhydrides of organic carboxylic acids that are useful in the catalyst system include hydrides of saturated and unsaturated aliphatic carboxylic acids and hydrides of aromatic carboxylic acids and hydrides of cycloaliphatic carboxylic acids and hydrides of substituted carboxylic acids, such as halo-substituted organic carboxylic acids. The carboxylic acids can be mono- or poly-carboxylic acids but perferably are mono-carboxylic acids. In addition, the catalyst system cannot only contain a single type of carboxylic acid but can also contain a mixture of different anhydrides of carboxylic acids. Such a mixture can include different saturated or unsaturated aliphatic carboxylic acids, different cycloaliphatic carboxylic acids, different aromatic carboxylic acids and aliphatic carboxylic acids. Usually the aliphatic acids from which suitable anhydrides can be obtained contain up to about 22 carbon atoms and are such acids as acetic acid, citrionic acid, maleic acid, proprionic acid, n-butyric acid, 2,3-dimethylmaleic acid, stearic acid, idacanic acids, succinic acid, n-decylsuccinic acid and methylsuccinic acid. The cycloaliphatic acids from which suitable anhydrides can be obtained generally contain 4 to 6 carbon atoms in the cycloaliphatic ring, such as cyclobutane-carboxylic acid, 1,2,3,4-cyclopentanetetracarboxylic acid, 1,2-cyclohexane-dicarboxylic acid and 4-cyclohexene-1,2-dicarboxylic acid. The aromatic acids from which suitable anhydrides can be derived can be mononuclear such as benzoic acid, terephthalic acid and pyromalitic acid or polynuclear such as 1,8-phthalic acid.

Some examples of suitable anhydrides of a carboxylic acid include acetic anhydride, paramalitic and dianhydride benzoic anhydride, malaic anhydride, n-butyric anhydride, chloromalaic anhydride, etc. The preferred anhydrides of monocarboxylic acids that are desired in the catalyst system of the present invention are benzoic anhydride, stearic anhydride and acetic anhydride, with the most preferred being the benzoic anhydride. The particular anhydride to be employed can be selected according to their decomposition temperature so that it becomes an active portion of the catalyst system at or near the desired cure temperature for the resin and/or can be selected according to the desired cure rate.

The most preferable combination of the anhydride of the carboxylic acid and the lead compound is such that there is present at least about 0.25 of the moles of the carboxylic acid of anhydride per mole of the lead compound. Of course, there can be as much as 3.5 carboxylic acid anhydride groups per mole of the lead compound. It should be noted that in addition, in the catalyst system of the present invention, there can also be used a combination of the lead compound with a carboxylic acid and particularly one of the carboxylic acids of one of the hydrides mentioned previously. However, the carboxylic acid is not preferred in the present invention since it does not enhance the shelf stability of the resulting molding or thermosetting silicone resin composition prior to its final cure. It should be noted that the carboxylic acid is used at the same concentration as the carboxylic acid anhydride with the lead compound mentioned previously.

Irrespective of whether the lead compound is used alone or is used in combination with a carboxylic acid anhydride or a carboxylic acid, the total amount of catalyst material is present in the concentration of 0.01 to 6% by weight of the otal weight of the low silanol content resin and the high silanol content resin. It should be mentioned that higher concentrations of the catalyst system can be used without any advantages. In addition, concentrations below the level indicated above do not result in the necessary catalytic activity in the resulting composition.

As mentioned previously, there is preferably incorporated a filler in the present thermosetting silicone resin composition, especially when it is used as a molding composition. Such a filler, and particularly the total amount of filler materials that may be incorporated into the molding composition, may vary from 5% to 500% by weight of the total weight of the high silanol content resin and the low silanol content resin. Such total filler content may comprise various types of well known filler materials for molding compositions. However, to obtain a molding composition with exceptional tensile strength and good flexure strength, it is desirable to incorporate various different types of fillers at different concentrations into the final molding composition. Thus, it is preferred to incorporate into the initial mixing of the ingredients of the molding composition from 5% to 200% by weight of the total weight of high silanol content resin and low silanol content resin of a ground fused silica type of silica filler. More than 200% of such a filler may be used. However, it is not desired to incorporate too much of this type of filler since the presence of excessive amounts beyond 200% by weight of such a filler in the molding composition increases the viscosity of the resulting melt that is formed from the molding composition ingredients, thus detracting from the flowability of the melt. Thus, it has been found that in order to increase the viscosity of the resulting molding composition melt in the transfer molding process, it is desirable to incorporate into the uncured molding composition a certain concentration of silazane treated fumed silica filler. Such a silazane treated filler prevents the uncured molding composition from structuring while it is stored prior to the transfer molding operation. At the same time, the presence of such a filler increases the viscosity of the uncured silicone resin molding composition melt sufficiently so that it can be handled easily without making the melt so viscous that it will not flow easily. In other words, the silazane treated filler is preferably added to the silicone molding composition mixture in order to control the viscosity of the silicone resin molding composition melt that is formed from the uncured resin mixture prior to the transfer molding operation. Thus, for this purpose, there is preferably incorporated into the molding composition 2 to 40% by weight of the total weight of high silanol content resin and low silanol content resin of a disilazane treated silica filler. A disilazane treated filler is, for instance, disclosed in Brown et al. U.S. Pat. 3,334,062, whose disclosure is hereby incorporated into the present case by reference. This patent, for instance, discloses treating a silica filler, either fumed silica or precipitated silica, at a temperature of 15° C. to 175° C. with the cyclosiloxane of the formula, $(M_2SiO)_3$ in the presence of at least 0.2 mole percent of a catalyst selected from the group consisting of ammonium hydroxide, ammonium carbonate and other ammonium compounds or amides, where M stands for monovalent hydrocarbon radicals and halogenated monovalent hydrocarbon radicals. Other silazane treated fillers are well known in the art and such fillers are easily available commercially.

The third type of filler incorporated into the preferred molding composition of the present case is glass fibers. The glass fibers are incorporated in the silicone resin molding composition so as to make the resulting molded product less brittle and give it flexure strength, as well as increased tensile strength. Thus, in the preferred molding composition of the present invention, it is preferred that there be incorporated from 15% to 150% by weight of the total weight of high silanol content silicone resin and low silanol content silicone resin of glass fibers. Thus, in the present thermosetting silicone resin composition and preferably silicone resin molding composition, it is preferred to add three types of fillers to the composition, (I) ground fused silica, (2) a silazane treated fumed silica filler and (3) finally, glass fibers. The process aids which have been mentioned previously are normally added initially when the silica filler is added to the composition since fumed silica or precipitated silica filler is very difficult to disperse into the other ingredients and particularly the low or high silanol content resin. In addition to the other components of the present invention there is also added to the thermosetting silicone resin composition of the present case, and particularly to molding silicone resin composition, a release agent which facilitates the removal of the molded part from the mold cavity. Although such a release agent does not have to be used, it is preferably added to facilitate the molding operation and, in particular, a transfer molding operation. Usually such a release agent may be stearyl alcohol, calcium stearate or some salt of a fatty acid. Such a release agent is usually added a concentration of less than 5% by weight of the total weight of the high silanol content resin and the low silanol content resin. In addition, for molding compositions, and particularly molded encapsulated parts which encapsulate electronic equipment, it is preferred that the encapsulated molded product have a dark color, such as black. In order to impart this black color to the molded encapsulated product, it is usual to add a black pigment and usually there is added about 1% or less by weight of the total of the high silanol content resin and low silanol content resin of the desired pigment color.

In the preparation of the molding silicone resin composition of the present case, it is desirable to first mix the low silanol content resin with the fumed or precipitated silica filler and the ground fused silica. This mixing is preferably carried out in a high speed blade mixer at a speed in the order of 4,000 r.p.m. for approximately 4 minutes. After the ingredients are thoroughly mixed, then there is added to the mixture the process aid, the pigment, the release agent and the catalyst system. The resulting ingredients are then mixed in with the other components at the speed of about 2,000 r.p.m. for approximately 2 minutes. Then there is added to this mixture the proper quantity of the binder resin, that is, the high silanol content resin and the resulting mixture is once again mixed at a speed of 2,000 r.p.m. in a high speed mixer for a period of about 2 minutes. At the end of that time, the glass fibers are added to the ingredients and the mixture is agitated at a speed of 2,000 r.p.m. for 1 minute. The resulting mixture is fed from the mixer onto a double screw conveyor which feeds the rotor mixer. A temperature of the order of 80° C. to 100° C. is employed and a roller speed in the neighborhood of 500 to ±100 r.p.m. is employed. The output of the rotor mixer which has been fluidized by the heat generated in the mixer is fed between two rollers where it is formed to a solid sheet. The sheet is cooled to room temperature and granulated in a grinder to a particle size of approximately 10 mesh. This 10 mesh particle size of approximately 10 then be used in an injection or transfer compression molding apparatus.

The following examples are given for purpose of illustrating the invention and for more clearly describing the invention and they are not intended in any way to limit the scope of the invention. All parts in the examples are by weight.

Example 1

A low silanol content resin was prepared by adding to 300 parts of water a silane blend consisting of 88 parts of methyltrichlorosilane, 229 parts of phenyltrichlorosilane, 279 parts of dimethyldichlorosilane and 411 parts of a diphenyldichlorosilane. The rate of addition was controlled for 20 minutes maintaining a peak reaction rate below 85° C. The mixture was stirred for 10 minutes then 400 parts of toluene was added and stirred for 10 minutes. The mixture was allowed to settle and the organic layer was recovered by separating and drawing off the bottom acid layer. The resin solids were 40% by weight in toluene. Then 300 parts per million potassium hydroxide based on resin solids were added from a 10% water solution of the hydroxide resin solution. The mixture was heated to reflux for one hour and the condensate was continually trapped off. The potassium hydroxide was neutralized with an excess of acetic acid and then the solvent in excess of acetic acid was stripped off to a batch temperature of 120° C. to 130° C. and 70% to 80% solids. Thus, there was prepared a resinous copolymer of $CH_3SiO_{3/2}$ units, $C_6H_5SiO_{3/2}$ units, $(CH_3)_2SiO_2$ units and $(C_6H_5)_2SiO_2$, where the $CH_3$, $C_6H_5$ to Si ratio was 1.7 to 1 and the silanol content as determined by Zerewitinoff analysis is 0.2 weight percent.

A high silanol content resin was prepared by taking a silane blend of 19.5 moles of methyltriethoxysilane, 28.5 moles of methyltrichlorosilane, 47 moles of phenyltrichlorosilane, 5 moles of dimethyldichlorosilane and hydrolyzing it in a mixture of toluene-acetone and water. For every thousand parts of the silane blend, there was 35.47 parts of the toluene-acetone and water mixture. The mixture was composed of 825 parts of toluene, 722 parts of acetone and 3,000 parts of water. The hydrolysis was carried out by adding the silane blend to a preheated mixture of the toluene-acetone and water. The silane blend was added over a 25 minute period, during which time the temperature of the hydrolysis mixture went from 25° C. to 70° C. After the silane addition had been completed, the hydrolyzate was agitated for 5 minutes. The agitation was stopped and the layer separated very rapidly. As soon as separation was completed, the resin was transferred into a bodying kettle and vacuum stripped at 40° C. to a solids content of 50%. The resin which has been formed by the aforedescribed hydrolysis process was vacuum dried using a continuous foam evaporator. When all of the solvent had been removed, the resin was then cast, cooled to room temperature and ground to a fine powder. In particular, this resin, as prepared by the above process, was composed of methyltrisiloxy, phenyltrisiloxy and dimethyldisiloxy units, where the methyl and phenyl radicals to silicon atom ratio was 1.4 and the silanol content of the resin was 5.5 weight percent and the alkoxy content of the resin was 0.8 weight percent.

A molding compound was prepared by adding to a high speed blade mixture 1640 parts of the low silanol content resin prepared as above, 11,800 parts of ground fused silica filler, 1,750 parts of disilazane treated fumed silica filler, which ingredients were mixed in a high speed blade mixture at a blade speed of 4,000 r.p.m. for 8 minutes. After this, there was added to the mixture 125 parts of a dimethyldiphenyl silanol-stopped polysiloxane as a process aid, 40 parts of black pigment, 100 parts of stearyl alcohol release agent, 55 parts of lead carbonate and 17 parts benzoic anhydride. The mixture of ingredients was once more mixed for four minutes in a high speed blade mixer at a blade speed of 4,000 r.p.m. At the end of that time, there was added to the mixture 3,800 parts of the high silanol content resin and the resulting mixture was stirred at 2,000 r.p.m. for 2 minutes. Then there was added to the mixture of ingredients 2,720 parts of glass fibers and the resulting mixture of ingredients was mixed at 2,000 r.p.m. in a high speed blade mixer for 30 seconds. The blend which is formed is then transferred from the mixer into a double screw conveyor which feeds the roller mixer. The screw chamber has a temperature of 90° C. and a roller speed of 500 r.p.m. was applied. The output of the rotor mixture which is fluidized by the heat generated in the mixture was then fed through two rollers to be formed into a solid sheet. The sheet was cooled to room temperature and granulated in a grinder to a particle size of approximately 10 mesh. The molding compound which was formed by the above method was then used in a transfer molding apparatus to form transistor bodies. This involved the heating of the molding compound to 150° C., transferring the molded compound through channels of a molding apparatus into a mold cavity which had been heated to 175° C. The molding compound was allowed to cure in the mold cavity 2 minutes, then the transistor casing which had been formed was removed and found to be perfectly and correctly formed having no voids or blow holes. The molded part was then baked for 2 hours at 200° C. to eliminate any traces of moisture or gasses which have been formed during the molding operation. In the above molding composition there was used 70% by weight of the high silanol content resin based upon the total weight of the high silanol content resin and low silanol content resin and 30% by weight of the low silanol content resin. There was also prepared a molding composition using the exact same procedure outlined above but using only the high silanol content resin by itself in the molding composition, which molding composition shall be referred to as Control Molding Composition A, and that the total weight of the high silanol content resin was equivalent to the total weight of the combined high silanol content resin and the low silanol content resin as disclosed in the present example. A molded part was formed from Control Molding Composition A using the same procedure that was used for the molding composition of the present invention. Then the molded part formed in accordance with the present invention was subjected to a thermal shock test by being cooled to −65° C. and after it had reached that temperature it was heated to 175° C. in a period of less than 10 seconds. This is referred to as one cycle. The part was then cooled from 175° C. to −65° C. in less than 10 seconds which is again referred to as a single cycle. This heating and cooling was repeated until the molded part failed, that is, it cracked or developed crazing on its surface. The molded part formed from Control Composition A failed in the first cycle. The molded part formed from the composition of the present invention did not fail even after three cycles, thus proving the superiority of the molding compounds of the present invention to thermal shock.

Example 2

There was mixed 1640 parts of the low silanol content silicone resin of Example 1 with 1750 parts of disilazane treated silica to which was added 9080 parts of ground fused silica filler. The resulting mixture was mixed in a high speed mixer at 4,000 r.p.m. for 8 minutes. To the resulting mixture there was added 125 parts of dimethyl diphenylsilanol-stopped process aid, 40 parts of a pigment, 100 parts of stearyl alcohol as a release agent, 55 parts of lead carbonate and 17 parts of benzoic anhydride. The resulting ingredients were mixed in the high speed mixer for 4 minutes at 2,000 r.p.m. Then there was added to the ingredients 3800 parts of the high silanol content resin of Example 1, which high silanol content resin comprised 70% by weight of the total weight of high silanol content resin and low silanol content resin. The resulting ingredients were then mixed in the high speed mixer at 2,000 r.p.m. for 2 minutes. There was then added to the ingredients 5450 parts of glass fibers which were mixed at 2,000 r.p.m. for 30 seconds. The blend was then transferred from the mixture onto a double screw conveyor which fed a rotor mixer. The output of the rotor mixer which has been fluidized by the heat generated in the mixer was fed between two rollers which formed a solid sheet. The sheet was cooled to room temperature and granulated in a grinder to a particle size of approximately 10 mesh. The molding compound which was formed by the above method was used in the transfer molding apparatus to form a molded transistor body. This involved heating the molding compound to 150° C., transferring the molten compound through the channels of the molding apparatus and into a mold cavity which has been heated to 175° C. The resin was allowed to cure in the mold cavity for 2 minutes. After that, the molded part was removed and found to accurately formed without any voids or blow holes. The sample body was then tested and found to have the following properties:

|  | P.s.i. |
|---|---|
| Flexure strength (ASTM D-790) | 9200 |
| Tensile strength (ASTM D-638) | 5500 |

The molded compound formed in accordance with the mixture of this example was subjected to the thermal shock test set forth in Example 1. The molded compound of this example underwent five cycles before it crazed, thus indicating a superior resistance to thermal shock.

In addition, another molded part was made with the molding composition of this example in exact accordance with the procedure set forth above. This molded part was cooked in a pressure cooker at 300° F. for 4 hours. It was found that after a 4 hour period of time, the molded part had only a weight gain of 0.22 weight percent as compared with its weight prior to the pressure cooker test, thus indicating superior moisture resistance. When the molded part made in exactly the procedure outlined in this example and using the Control Composition A of Example 1 was submitted to this pressure cooker test, such sample had a weight gain of 0.28 weight percent after 4 hours in the pressure cooker. Thus, as is obvious from the above data, the molding compounds from the molding composition of the present invention have superior moisture resistance and moisture pickup.

Example 3

There was mixed in a high speed mixer, 1730 parts of the low silanol content resin of Example 1 with 1750 parts of silazane treated fumed silica filler and 7300 parts of ground fused silica filler. These ingredients were mixed at 4,000 r.p.m. for 8 minutes in the mixer. There was then added to the ingredients 125 parts of a process aid, 40 parts of a pigment, 100 parts of a stearyl alcohol, 55 parts of lead carbonate and 17 parts of benzoic anhydride. These ingredients were mixed in a high speed mixer for 4 minutes at 2,000 r.p.m. Then there was added to these ingredients 4100 parts of the high silanol content resin of Example 1, such that there was present 70% by weight of the high silanol content resin based on the total weight of the high silanol content resin and the low silanol content resin. The resulting ingredients were mixed at 2,000 r.p.m. in the high speed mixer for 2 minutes. Then there was added 7300 parts of glass fibers to the mixture, which glass fibers were incorporated by mixing them in the high speed mixer at 2,000 r.p.m. for 30 seconds. The composition was then milled on a two roll mill at a temperature of 100° C. for 5 minutes. The resulting composition was then cooled to 25° C. and granulated. The composition was molded for 3 minutes at 175° C. and 1,000 p.s.i. to produce a molded test specimen. The molded test sample when removed from the hot mold was rigid, unblistered and free of any voids. This molded sample had the following properties:

|  | P.s.i. |
|---|---|
| Tensile strength | 5500 |
| Flexure strength | 9500 |

There was then produced a molding composition which will hereinafter be referred to as Control Composition B, which had the same ingredients as that mentioned for the molding composition of this example, with the exception that it did not have any low silanol content resin and that the total weight of the high silanol content silicone resin was equal to the total weight of the high silanol content resin and the low silanol content resin of the molding composition of this example. The exact same procedure was followed to produce a molded sample from Control Composition B. Both the molded sample of the present invention and the molded sample formed from Control Composition B were tested in the thermal shock test of Example 1, that is, heating and cooling the samples from the temperature of −65° C. to 175° C. in less than 10 seconds. The molded compound formed from Control Composition B failed in the first cycle. The molded product formed from the composition of the present case was able to go through nine cycles before crazing appeared, which shows the superiority of the composition of the present invention to thermal shock.

Example 4

To 545 parts of the low silanol content resin of Example 1, there was added 1220 parts of disilazane treated fumed silica filler and 9080 parts of ground fused silica filler. The resulting ingredients were mixed at 4,000 r.p.m. in a high speed mixer for 8 minutes. To these ingredients there was then added 125 parts of a dimethyldiphenyl silanol-stopped process aid. Then there was added 40 parts pigment, which is the normal type of black pigment, 100 parts of stearyl alcohol as a release agent and 65 parts of lead carbonate. The resulting ingredients were then mixed at 2,000 r.p.m. for 4 minutes. To this mixture there was then added 4950 parts of the high silanol-stopped silicone resin such that there was present 90% by weight of the high silanol-stopped resin based on the total weight of low silanol-stopped resin and high silanol-stopped resin. These ingredients were mixed at 2,000 r.p.m. for another 2 minutes. To this mixture there was added 5450 parts of glass fiber, which ingredients were then mixed at 2,000 r.p.m. for 30 seconds. The resulting mixture was transferred from the mixer to a double screw conveyor which fed a roller mixer. A screw chamber temperature of 90° C. was maintained and a roller speed of 500 r.p.m. applied. The composition in the rotor mixer which had been fluidized by heat generated in the mixer was then fed between two rollers where it was formed into a solid sheet. The sheet was cooled to room temperature and granulated in a grinder to a particle size of approximately 10 mesh. The molding compound which was formed by the above method has been used in transfer molding apparatus to form transistor bodies. This was accomplished by heating the molding compound to 150° C., transferring the molten compound to the channels of the molding apparatus into the mold cavity which was heated to 175° C. The resin was allowed to cure in the mold cavity for 2 minutes so as to form a rigid transistor casing which was free of voids and blow holes. The resulting molded product had the following properties:

|  | P.s.i. |
|---|---|
| Tensile strength | 6000 |
| Flexural strength | 9800 |

The resulting molding compound was then tested in a thermal shock resistance test by heating the molded compound to 175° C. and then cooling to 0° C. in less than 5 seconds. One cycle is considered a single phase of cooling the molded part from a temperature of 175° C. to 0° C. This cooling procedure was repeated until the molded part crazed or broke. A molded part was also formed using Control Composition A of Example 1 and following the exact procedure outlined in Example 1. This was also tested in the thermal shock test of this example. The molded compound formed from Control Composition A failed and broke in the first cycle. The molded compound formed from the molding composition of the present example was able to go through three cycles before it crazed, thus showing the superior thermal shock resistance of the molding compositions of the present case.

In addition, the molding compound of this example was placed in a pressure cooker, maintained at 300° F., and kept in such a pressure cooker for a period of 4 hours. After such a period of 4 hours, it was discovered that the molding compound of this example had a weight gain of only 0.22 weight percent as compared to a weight gain of 0.30 weight percent of the molded object formed from Control Composition A. Thus, it is seen in the molding compound of this example and of the present invention, it has superior moisture resistance as compared to molding compositions that do not have therein any low silanol content resin.

Example 5

There was added to 1090 parts of the low silanol content resin of Example 1, 1450 parts of disilazane treated fumed silica filler, 9080 parts of a ground fused silica filler and the resulting ingredients were mixed in a high speed mixer at 4,000 r.p.m. for 8 minutes. To these ingredients there was then added 125 parts of a dimethyldiphenyl silanol-stopped process aid, 40 parts of a pigment, 100 parts of stearyl alcohol as a release agent and 60 parts of lead carbonate as the catalyst. These ingredients were mixed at 2,000 r.p.h. for 4 minutes. Then there was added to these ingredients 4350 parts of the high silanol content resin of Example 1, where there was present in the molding composition 80% by weight of the high silanol content resin based on the total weight of high silanol content resin and low silanol content resin. The high silanol material was mixed into the other ingredients at a speed of 2,000 r.p.m. for 2 minutes. Then there was added to the mixture 5450 parts of glass fibers and the ingredients were mixed at 2,000 r.p.m. for 30 seconds. The resulting composition was then milled in a two roll mill at a temperature of 100° C. for 5 minutes. Then the molded product was cooled to 25° C. and granulated. The granules of the molding composition were then molded for 3 minutes at 175° C. and 1,000 p.s.i. to produce a 6 inch by 6 inch by 1/16 inch test specimen. The molded sample as removed from the mold was rigid, unblistered and free of any voids or blow holes. The sample had the following properties:

|  | P.s.i. |
|---|---|
| Flexure strength | 9600 |
| Tensile strength | 5500 |

This sample was tested in the thermal shock test outlined in Example 4, that is, the rapid cooling of the molded compound sample from 175° C. to 0° C., in a period of 5 seconds or less. The molded sample was able to undergo 5 cycles in such a test before it crazed, as compared to the molded compound of Example 4. The presence of the additional low silanol content resin markedly enhanced the thermal shock resistance of the resulting molding compound.

Example 6

There was mixed into 1640 parts of the low silanol content resin of Example 1, 1750 parts of disilazane treated fumed silica filler and 9080 parts of ground fused silica filler. The resulting ingredients were mixed in a high speed mixer for 8 minutes at 4,000 r.p.m. After this, there was added to these ingredients 125 parts of dimethyldiphenyl silanol-stopped process aid, 40 parts of a pigment, 100 parts of stearyl alcohol release agent, and 55 parts of lead carbonate as the catalyst. The resulting ingredients were mixed at 2,000 r.p.m. for 4 minutes in a high speed mixer. To these ingredients there was then added 3800 parts of a high silanol content resin such that in the mixture there was present 70% by weight of the high silanol content resin and 30% by weight of the low silanol content resin based on the total weight of both resins present in the molding composition mixture. The resulting ingredients were mixed for 4 minutes at 2,000 r.p.m. At this time, there was added 5450 parts of glass fibers and the ingredients mixed at 2,000 r.p.m. for 30 seconds. The resulting composition or blend of ingredients was then milled on a two roll mill at a temperature of 100° C. for 5 minutes to form a sheet. This sheet was cooled to 25° C. and granulated so that the granules were the size of 10 mesh or less. Then the composition was molded 3 minutes at 175° C. and 1,000 p.s.i. to produce a 6 inch by 6 inch by 1/16 inch test specimen. The molded sample that was formed was rigid and was free of voids and blow holes. The physical proerties of this sample were as follows:

|  | P.s.i. |
|---|---|
| Flexure strength | 9400 |
| Tensile strength | 5300 |

This molded sample was then tested in the same thermal shock test as that outlined in Examples 4 and 5. The molded compound formed in accordance with this example was able to go through 14 cycles of being cooled from 175° C. to 0° C. in less than 5 seconds without crazing or cracking.

We claim:
1. A silicone resin thermosetting composition having improved thermal shock resistance comprising (a) a silicone resin of a high silanol content of the formula,

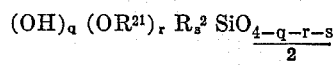

where $R^2$ is selected from the class consisting of lower alkyl radicals having 1 to 8 carbon atoms; cycloalkyl radicals having 5 to 7 carbon atoms; lower alkenyl radicals having 2 to 8 carbon atoms; mononuclear aryl radicals; mononuclear aryl lower alkyl radicals having 1 to 6 carbon atoms in the alkyl group; and halogenated derivatives of the above radicals; ($OR^{21}$) is a lower alkoxy radical containing from 1 to 8 carbon atoms per radical; $q$ has a value of 0 to 1.0; $r$ has a value of 0 to 1.0; $s$ has a value of 1.0 to 1.8 and the sum of $q$ plus $r$ has a value of 0.01 to 1.0, wherein the base resin has a silanol and alkoxy group content of at least 4% by weight and the content of silanol groups by themselves is at least 3% by weight, (b) a low silanol content silicone resin which comprises 5 to 50% by weight of the total of (a) and (b) comprises $RSiO_{3/2}$ units and $R_2SiO_2$ units, where the R to Si ratio may vary from 1:1 to 1.9:1 and the ratio of the $RSiO_{3/2}$ units to the $R_2SiO_2$ units may vary from 1:2.5 to 1:5.0 and containing less than 0.5 weight percent silanol groups where R is selected from the group consisting of alkyl radicals, cycloalkyl radicals, alkenyl radicals, mononuclear aryl radicals, mononuclear aryl lower alkyl radicals and haloegnated derivatives of the foregoing radicals; (c) a catalyst system and (d) a filler.

2. The composition of claim 1 wherein the catalyst system comprises 0.01 to 6% by weight of (a) and (b) of a lead compound.

3. The composition of claim 1 wherein the lead compound is selected from the class consisting of

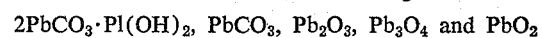

4. The composition of claim 3 wherein the catalyst system comprises 0.01 to 6% by weight of (a) and (b) of a lead compound and the anhydride of a carboxylic acid.

5. The composition of claim 3 wherein the catalyst system comprises 0.01 to 6% by weight of (a) and (b) of the lead compound and a carboxylic acid.

6. The composition of claim 4 further comprising the presence of 0.5 to 12% by weight of (a) and (b) of a process aid which is a silicone compound selected from the group consisting of a silane of the formula, $$R^3{}_t(OH)_u(OR^4)_vSi$$

where R is selected from the class consisting of lower alkyl radicals having 1 to 8 carbon atoms; cycloalkyl radicals having 5 to 7 carbon atoms in the ring; lower alkenyl radicals having 2 to 8 carbon atoms; mononuclear aryl radicals; mononuclear aryl lower radicals having 1 to 6 carbon atoms in the alkyl group; and halogenated derivatives of the above radicals; $OR^4$ is a lower alkoxy radical containing from 1 to 8 carbon atoms per radical; $t$ has a value of 1 to 3; $u$ has a value of 0 to 3; $v$ has a value of 0 to 3; and the sum of $u$ plus $v$ has a value of 1 to 3; and a siloxane compound having the formula, $$R_x{}^5(OH)_y(OR^6)_z SiO_{\frac{4-x-y-z}{2}}$$

where $R^5$ and $(OR^6)$ are the same as $R^3$ and $(OR^4)$ above; $x$ has a value of 1 to 3 and when $x$ has a value of less than 1.7, there are at least 5% by weight based upon the weight of the siloxane compound of HO and $(OR^6)$ groups in the siloxane compound, $y$ has a value of 0 to 2; $z$ has a value of 0 to 2, and the sum of $y$ plus $z$ has a value of 0.02 to 2.

7. The composition of claim 6 further including a release agent.

8. The composition of claim 7 wherein part of the filler is glass fibers.

9. The composition of claim 1 wherein the high silanol content resin has a silanol group content of 4 to 11% by weight, based on the silicone resin.

10. The composition of claim 9 wherein $q$ has a value of 0.2 to 0.55; $r$ has a value of 0.2 to 0.53; and $s$ has a value of 1.05 to 1.75.

11. The composition of claim 1 wherein the sum of $q$ plus $r$ has a value of 0.2 to 0.55.

12. The composition of claim 1 wherein the high silanol containing resin has from 4 to 11% by weight of silanol groups and alkoxy groups.

13. The composition of claim 1 wherein the low silanol content resin has a ratio of the R to Si that varies from 1.7:1 to 1.9:1 and R is selected from the class consisting of methyl and phenyl.

14. The composition of claim 13 wherein at least 40 mole percent of the R groups in the $RSiO_{3/2}$ units and at least 40 mole percent of the R groups in the $R_2SiO_2$ units are phenyl.

15. The composition of claim 1 wherein the low silanol containing resin is substantially free of silanol groups.

16. A process for producing an uncured silicone resin composition which can be used to produce silicone resin molding compounds of superior thermal shock resistance comprising (a) mixing a filler with a low silanol containing silicone resin having $RSiO_{3/2}$ units and $R_2SiO_2$ units, where the R to Si ratio may vary from 1:1 to 1.9:1 and the ratio of the $RSiO_{3/2}$ units to $R_2SiO_2$ units may vary from 1:2.5 to 1:5.0 and containing less than 0.5 weight percent silanol groups, where R is selected from the class consisting of alkyl radicals, cycloalkyl radicals, alkenyl radicals, mononuclear aryl radicals, mononuclear aryl lower alkyl radicals and halogenated derivatives of the foregoing radicals; (b) then agitating into the above mixture a pigment, a catalyst system, a process aid and a release agent; (c) incorporating into the mixture a high silanol content binder resin of the formula, $$(OH)_q(RO^{21})_r R_s{}^2 SiO_{\frac{4-q-r-s}{2}}$$

where $R^2$ is selected from the class consisting of lower alkyl radicals having 1 to 8 carbon atoms; cycloalkyl radicals having 5 to 7 carbon atoms; lower alkenyl radicals having 2 to 8 carbon atoms; mononuclear aryl radicals; mononuclear aryl lower alkyl radicals having 1 to 6 carbon atoms in the alkyl groups; and halogenated derivatives of the above radicals; $(OR^{21})$ is a lower alkoxy radical containing from 1 to 8 carbon atoms per radical, $q$ has a value of 0 to 1.0; $r$ has a value of 0 to 1.0; $s$ has a value of 1.0 to 1.7 and the sum of $q$ plus $r$ has a value of 0.01 to 1.0, wherein the above resin has a silanol group and alkoxy group content of at least 4% by weight of the resin and a silanol group content of at least 3% by weight of the resin; (d) mixing into the resulting mixture additional filler; (e) extruding the resulting mixture into a sheet and (f) grinding the resulting sheet into particles.

17. The process of claim 16 wherein the process aid is present at a concentration of 0.5 to 12% by weight of the high silanol content resin and low silanol content resin and is a silicone compound selected from the class consisting of a silane of the formula, $$R^3{}_t(OH)_u(OR^4)_vSi$$

where R is selected from the class consisting of lower alkyl radicals having 1 to 8 carbon atoms; cycloalkyl radicals having 5 to 7 carbon atoms in the ring; lower alkenyl radicals having 2 to 8 carbon atoms; mononuclear aryl radicals; mononuclear aryl lower alkyl radicals, where the alkyl radical has 1 to 6 carbon atoms and halogenated derivatives of the above radicals; $OR^4$ is a lower alkoxy radical containing from 1 to 8 carbon atoms per radical; $t$ has a value of 1 to 3; $u$ has a value of 0 to 3; $v$ has a value of 0 to 3; and the sum of $u$ plus $v$ has a value of 1 to 3; and a siloxane compound having the formula, $$R^5{}_x(OH)_y(OR^6)_z SiO_{\frac{4-x-y-z}{2}}$$

where $R^5$ and $(OR^6)$ are the same as $R^3$ and $(OR^4)$ above; $x$ has a value of 1 to 3 and when $x$ has a value of less than 1.7, there are at least 5% by weight based upon the weight of the siloxane compound of HO and $(OR^6)$ groups in the siloxane compound; $y$ has a value of 0 to 2; $z$ has a value of 0 to 2, and the sum of $y$ plus $z$ has a value of 0.02 to 2.

18. The process of claim 16 wherein the first type of filler is silica filler which comprises 5% to 200% by weight of the low silanol content resin and the high silanol content resin.

19. The process of claim 16 wherein the additional filler is glass fibers and comprises 5% to 200% by weight of the total weight of the low silanol content resin and the high silanol content resin.

20. The process of claim 16 wherein the low silanol content resin is substantially free of silanol groups.

21. The process of claim 16 wherein the release agent is stearyl alcohol.

22. The process of claim 16 wherein there is present 0.01 to 6% by weight of the total weight of the low silanol content resin and the high silanol content resin of a catalyst system which is a lead compound selected from the class consisting of $2PbCO_3 \cdot Pb(OH)_2$, $PbCO_3$, $Pb_2O_3$, $Pb_3O_4$ and $PbO_2$.

23. The process of claim 22 wherein said catalyst system contains at least 0.25 mole of a carboxylic acid anhydride per mole of lead compound in the total catalyst system.

24. The process of claim 22 wherein said catalyst system contains at least 0.25 mole of a carboxylic acid per mole of lead compound in the total catalyst system.

25. The process of claim 16 wherein the mixing of the various ingredients is carried out at room temperature.

26. The process of claim 16 wherein the ingredients are extruded into a sheet at a temperature at 80° C. to 150° C.

27. The process of claim 16 wherein the high silanol content resin has a total silanol and alkoxy content of 4 to 11% by weight.

28. The process of claim 16 wherein the low silanol content resin has an R to Si ratio of 1.7:1 to 1.9:1 and R is preferably selected from methyl and phenyl.

29. The process of claim 28 wherein at least 40 mole percent of the R radicals in the $RSiO_{3/2}$ units and at least 40 mole percent of the R radicals in the $R_2SiO_2$ units are phenyl.

References Cited

UNITED STATES PATENTS

| | | | |
|---|---|---|---|
| 3,445,418 | 5/1969 | Gibbon et al. | 260—33.6 |
| 3,457,214 | 7/1969 | Modic | 260—825 X |

LEWIS T. JACOBS, Primary Examiner

U.S. Cl. X.R.

260—825; 264—141